United States Patent
Matsumoto et al.

(10) Patent No.: US 7,034,698 B2
(45) Date of Patent: Apr. 25, 2006

(54) WARNING SYSTEM WITH VIBRATION AND LANE DEVIATION PREVENTION SYSTEM WITH THE WARNING SYSTEM FOR AUTOMOTIVE VEHICLE

(75) Inventors: Shinji Matsumoto, Kanagawa (JP); Satoshi Tange, Kanagawa (JP); Tatsuya Suzuki, Kanagawa (JP); Naotaka Usui, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 169 days.

(21) Appl. No.: 10/830,104

(22) Filed: Apr. 23, 2004

(65) Prior Publication Data

US 2004/0252020 A1 Dec. 16, 2004

(30) Foreign Application Priority Data

May 28, 2003 (JP) .............................. 2003-151322

(51) Int. Cl.
*G08B 23/00* (2006.01)
(52) U.S. Cl. ....................... 340/575; 340/903; 307/9.1; 701/301
(58) Field of Classification Search ........... 340/426.33, 340/575
See application file for complete search history.

(56) References Cited

U.S. PATENT DOCUMENTS

| 5,699,057 A | * | 12/1997 | Ikeda et al. ................. 340/937 |
| 6,014,595 A | * | 1/2000 | Kobayashi ..................... 701/1 |
| 6,278,362 B1 | * | 8/2001 | Yoshikawa et al. ......... 340/439 |
| 6,894,606 B1 | * | 5/2005 | Forbes et al. ............... 340/435 |

FOREIGN PATENT DOCUMENTS

| JP | 11-180327 A | 7/1999 |
| JP | 2000-33860 A | 2/2000 |
| JP | 2001-310719 A | 11/2001 |

\* cited by examiner

*Primary Examiner*—Jeffery Hofsass
*Assistant Examiner*—George Bugg
(74) *Attorney, Agent, or Firm*—Foley & Lardner LLP

(57) ABSTRACT

A warning system for an automotive vehicle produces a vibration in the vehicle simulating a rumble strip to inform a driver of various events. A vibration with braking torque is produced by controlling individually brake fluid pressure in each wheel brake cylinder, independently of manual braking operations. The warning system is applied to a lane deviation prevention (LDP) system. The LDP system provides a warning with vibration and a control effort of yawing moment by wheel torque or steering torque.

30 Claims, 10 Drawing Sheets

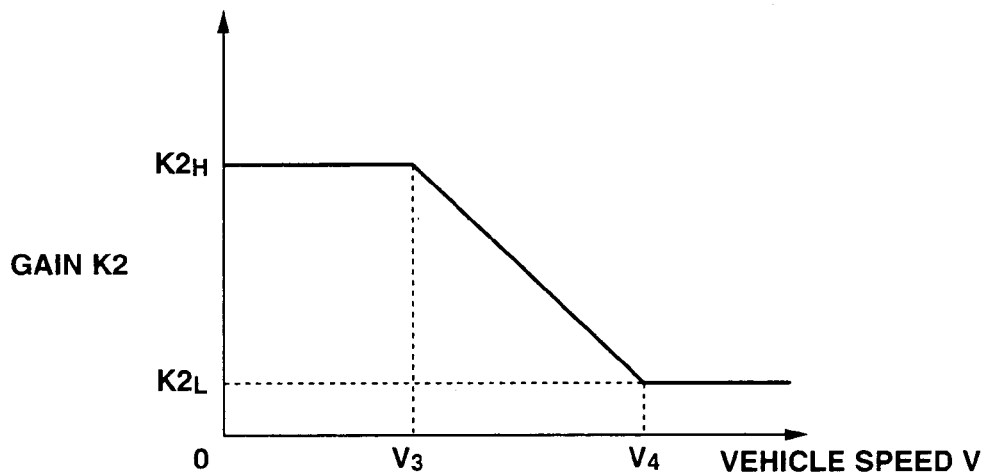
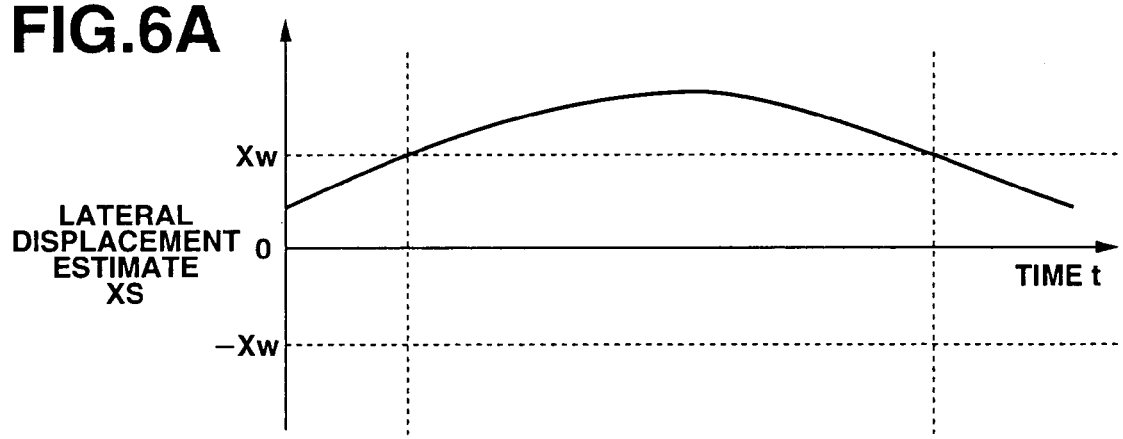
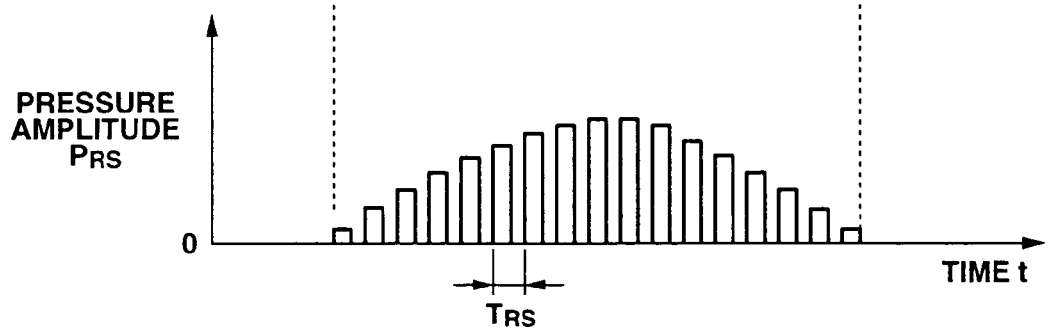

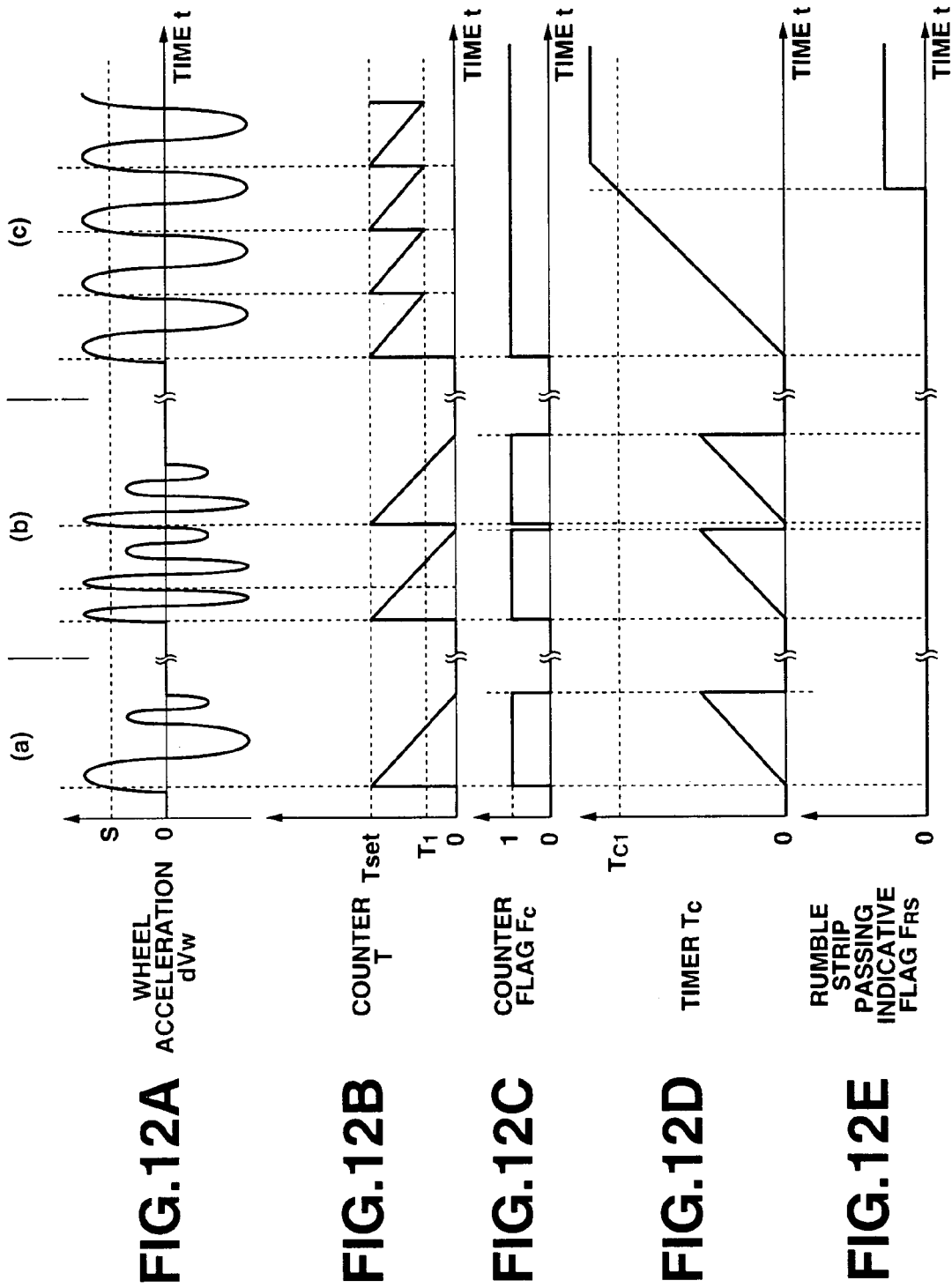

WARNING SYSTEM WITH VIBRATION AND LANE DEVIATION PREVENTION SYSTEM WITH THE WARNING SYSTEM FOR AUTOMOTIVE VEHICLE

BACKGROUND OF THE INVENTION

The present invention relates generally to warning systems for automotive vehicles, and more particularly to a warning system and a lane deviation prevention (LDP) system utilizing a warning system for an automotive vehicle.

Recent years, a rumble strip is proposed mainly for the purpose of preventing lane deviation of automotive vehicles. The rumble strip is provided on road shoulders, where is continuously formed road irregularities. While a vehicle is passing on a rumble strip, noise and vibration is generated in the vehicle. The noise and vibration calls a driver's attention to a potential lane deviation of the vehicle. This function of a rumble strip may be simulated on a road with no rumble strip. For example, when a vehicle tends to deviate from the current driving lane, an artificial noise resembling the noise that is actually generated in passing on the rumble strip, or vibrating the steering wheel may be provided to inform or warn a driver of a potential lane deviation.

SUMMARY OF THE INVENTION

With only the artificial noise resembling the noise that is actually generated in passing on the rumble strip, a driver has difficulty in immediately recognizing a tendency of lane deviation of the vehicle in some cases, such as a case of the state that the driver has fallen asleep. When the alarm with the artificial noise and the vibration of the steering wheel are combined, the steering mechanism needs a major change of the structure. This leads to an increase in the cost of the system.

Accordingly, it is an object of the present invention to provide a warning system with vibration and a lane deviation prevention system with the warning system that are capable of immediately and assuredly informing or warning a driver of a potential lane deviation, based on a driving condition of the vehicle with a minimum cost up.

In order to accomplish the aforementioned and other objects of the present invention, a warning system with vibration for an automotive vehicle comprises a sensing section detecting operational states of the vehicle, a wheel actuator variably adjusting road wheel speed of a road wheel, and a control unit configured to be connected electrically to the sensing section and the wheel actuator, for automatically controlling fluctuations in the road wheel speed to generate vibrations in the vehicle based on the operational states of the vehicle.

According to another aspect of the invention, a warning system with vibration for an automotive vehicle comprises sensing means for detecting operational states of the vehicle, wheel actuating means for variably adjusting road wheel speed of a road wheel, and control means for automatically controlling fluctuations in the road wheel speed to generate vibrations in the vehicle based on the operational states of the vehicle.

According to a further aspect of the invention, a method of warning with vibration for an automotive vehicle comprising, detecting operational states of the vehicle, determining a degree of lane deviation of the vehicle from a current driving lane based on the operational states of the vehicle, determining whether there is a possibility of lane deviation of the vehicle based on the degree of lane deviation, and producing fluctuations in a road wheel speed to generating vibrations in the vehicle when it is determined that there is a possibility of lane deviation of the vehicle.

The above objects and other objects, features, and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

FIG. 5 is a map for deriving a gain K2 for a desired yawing moment.

FIG. 6A is a time chart of a lateral displacement estimate XS of a sample operation of the first embodiment.

FIG. 6B is a time chart of an oscillation in hydraulic brake pressure of the sample operation of the first embodiment.

FIG. 12A is a time chart of a wheel acceleration dVw in the second embodiment.

FIG. 12B is a time chart of a counter T in the second embodiment.

FIG. 12C is a time chart of a counter flag $F_C$ in the second embodiment.

FIG. 12D is a time chart of a timer $T_C$ in the second embodiment.

FIG. 12E is a time chart of a rumble strip passing indicative flag $F_{RS}$ in the second embodiment.

DETAILED DESCRIPTION OF THE INVENTION

Figure 1:
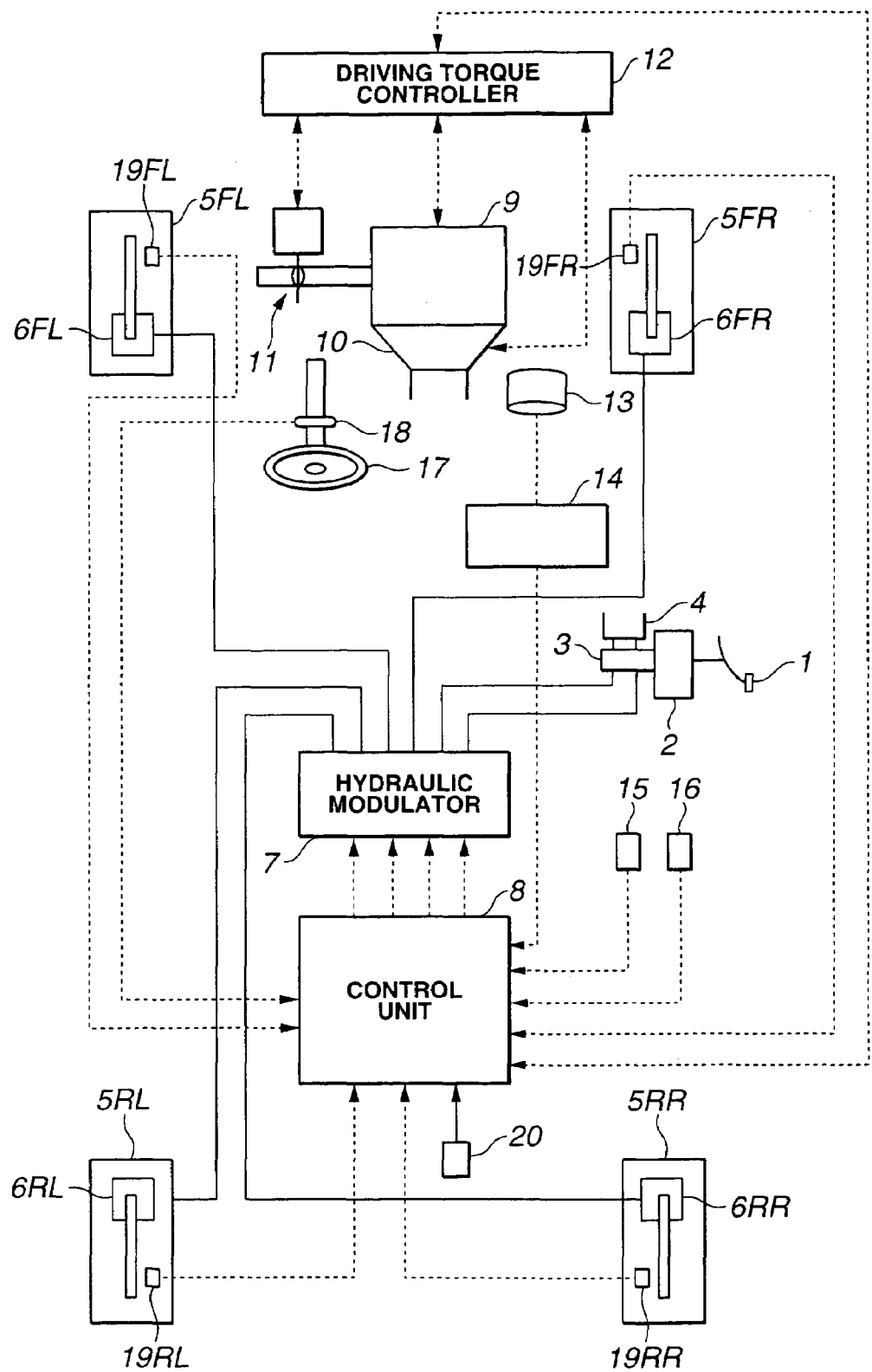
FIG. 1 is a block diagram depicting a lane deviation prevention system with a warning system with vibration of a first embodiment.

Referring now to FIG. 1, there is shown a rear drive automotive vehicle of a first embodiment of the present invention. When a brake pedal 1 is depressed, hydraulic brake pressure in a master cylinder 3, which is connected to a brake fluid reservoir 4, is generated according to the depression of brake pedal 1 via a brake booster 2. The hydraulic brake pressure is supplied to wheel brake cylinders 6FL through 6RR each provided at road wheels 5FL through 5RR.

A hydraulic modulator 7, which is adapted to be applied to hydraulic control systems such as an anti-skid braking system and a traction control system, is intervened between master cylinder 3 and wheel brake cylinders 6FL through 6RR. Hydraulic modulator 7 includes actuators such as a linear solenoid valve, for controlling individually hydraulic brake pressures in wheel brake cylinders 6FL through 6RR, independently of driver's manual braking operations of brake pedal 1. Hydraulic modulator 7 regulates or variably adjusts individual hydraulic brake pressures in wheel brake cylinders 6FL through 6RR, according to desired wheel brake cylinder pressures $Ps_{FL}$ through $Ps_{RR}$ output by a control unit 8 (described below).

A driving torque controller 12 is provided to control driving torques applied to left and right rear road wheels 5RL and 5RR as driving wheels by regulating the operational condition of an engine 9, the speed ratio of an automatic transmission 10, and the opening of a throttle valve 11. Driving torque controller 12 controls the driving torques applied to left and right rear road wheels 5RL and 5RR, according to a desired driving torque Trq output by control unit 8.

A CCD camera 13 is provided to monitor and capture an image in front of the host vehicle. The image is input to an image-processing device 14. Image processing device 14 detects the current driving lane, recognizing lane markers such as white lane marking lines. In addition, a yaw angle or heading angle φ of the host vehicle with reference to the direction of the current driving lane, a lateral displacement X of the host vehicle from the central position of the current driving lane, and a trajectory curvature β of the current driving lane are derived from the image. When the vehicle is traveling on a road where the white lane marking lines is fading or covered by the snow, it is impossible to detect the white lane marking lines. In this case, the variables of yaw angle φ, lateral displacement X, and trajectory curvature β are assumed and set to "0". On the other hand, when it is temporarily impossible in a short time to detect the white lane marking lines, which is caused by a noise or an obstacle in a short time, the variables are assumed and set to the last detected value.

Several sensors are provided in the system, for detecting operational states of the vehicle as a sensing section. A master cylinder pressure sensor 15 detects a master cylinder pressure Pm in master cylinder 3. An accelerator position sensor 16 detects an accelerator opening Acc as a depressed amount of an accelerator pedal. A steering wheel angle sensor 18 detects a steering wheel angle σ of a steering wheel 17. Wheel speed sensors 19FL through 19RR detect wheel speeds $Vw_{FL}$ through $Vw_{RR}$ of road wheels 5FL through 5RR. A direction indicator switch 20 detects an operational state of a direction indicator (not shown). The signals of the variables detected by the sensors are input into control unit 8. In addition, yaw angle φ of the host vehicle with reference to the direction of the current driving lane, lateral displacement X of the host vehicle from the central position of the current driving lane, and trajectory curvature β of the current driving lane, detected by image processing device 14, are also input to control unit 8. If a variable concerning the operational state of the host vehicle has a lateral-directional value, a positive value indicates the left direction or deviation, and a negative value indicates the right direction. That is, yaw angle φ and steering wheel angle σ have positive values during left turn, and negative values during right turn. Lateral displacement X has a positive value during deviating from the central position of the current driving lane to the left, and a negative value during deviating to the right.

Figure 2A:
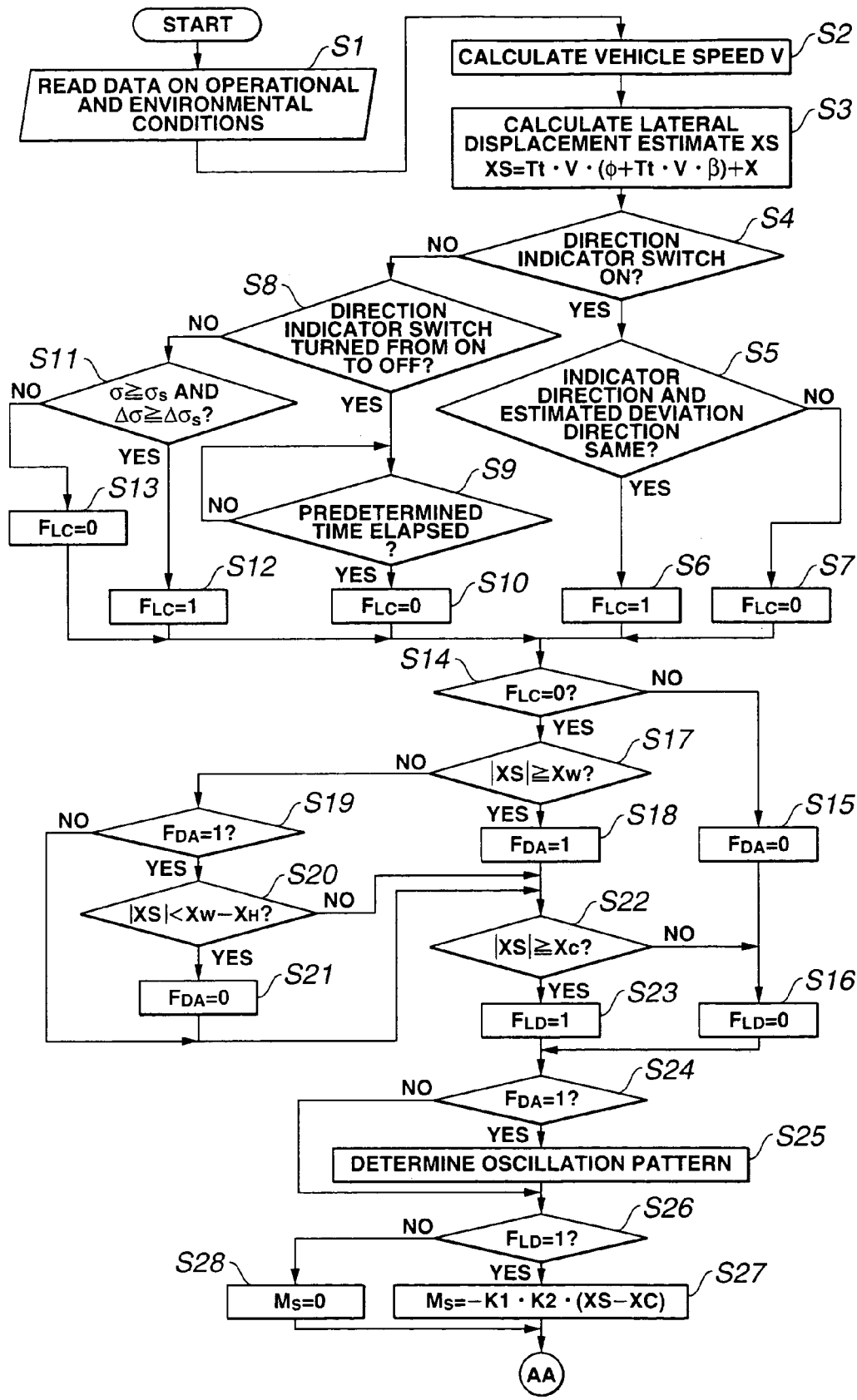
FIG. 2A is the first half of a flow chart depicting a routine of LDP control of the first embodiment.
Figure 2B:
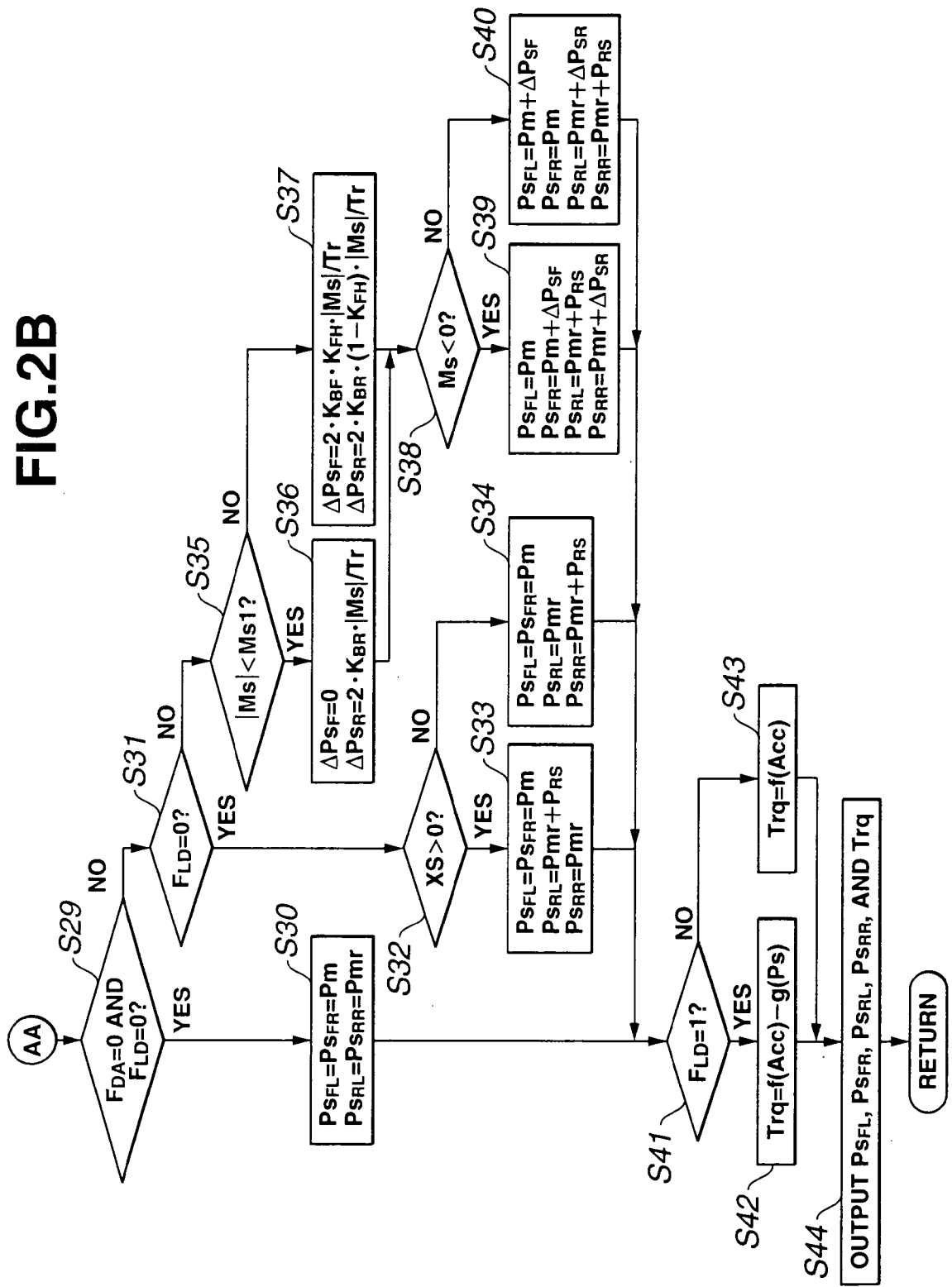
FIG. 2B is the second half of the flow chart depicting the routine of LDP control of the first embodiment.

Thus, the control unit is configured to be connected electrically to the sensing section, and hydraulic modulator 7 and driving torque controller 12 as a wheel actuator, for automatically controlling functions in the road wheel speed to generate vibrations in the vehicle based on the operational states of the vehicle. Referring now to FIGS. 2A and 2B, the following describes a lane deviation control (LDP) control executed by control unit 8. First, at step S1, control unit 8 reads data from the sensors and the controllers. In detail, the data includes wheel speed $Vw_{FL}$, accelerator opening Acc, master cylinder pressure Pm, steering wheel angle σ, the operational state of the direction indicator, and yaw angle φ of the host vehicle with reference to the direction of the current driving lane, lateral displacement X of the host vehicle from the central position of the current driving lane, and trajectory curvature β of the current driving lane, detected by image processing device 14.

Next, at step S2, a host vehicle speed V is calculated as an average of left and right front wheel speeds $Vw_{FL}$ and $Vw_{FR}$ of non-driven left and right front road wheels 5FL and 5FR, which are read through step S1. Then, at step S3, lateral displacement estimate XS, in other words, an estimate of a future lateral deviation or an estimate of a future lateral displacement, which indicates a degree of lane deviation of the host vehicle from the current driving lane, is estimated or arithmetically calculated. Concretely, lateral displacement estimate XS is estimated or arithmetically calculated based on the latest up-to-date information concerning yaw angle φ of the host vehicle with reference to the direction of the current driving lane, lateral displacement X of the host vehicle from the central position of the current driving lane, and trajectory curvature β of the current driving lane, read through step S1, and host vehicle speed V calculated through step S2, from the following equation (1).

$$XS = Tt \cdot V \cdot (\phi + Tt \cdot V \cdot \beta) + X \quad (1)$$

where Tt represents a headway time between the host vehicle and the preceding vehicle both traveling in the same lane, and the product (Tt·V) of the headway time Tt and the host vehicle speed V means a distance between the current position of the host vehicle and the forward point-of-fixation. That is, an estimate of lateral deviation from the central position of the current driving lane, which may occur after the headway time Tt, is regarded as a future lateral displacement estimate XS. Then, at step S4, it is determined whether or not direction indicator switch 20 is ON. When the answer to step S4 is NO, or when direction indicator switch 20 is OFF, the routine proceeds to step S8. On the other hand, when the answer to step S4 is YES, or when direction indicator switch 20 is ON, the routine proceeds to step S5.

At step S5, it is determined whether the indicated direction and the estimated direction of lateral deviation or the sign of lateral displacement estimate XS are same or not. When the answer to step S5 is YES, or when the indicated direction of direction indicator switch 20 and the estimated direction of lateral deviation or the sign of lateral displacement estimate XS are same, it is determined that a driver has an intention of lane changing. Then, the routine proceeds to step S6, where a lane-changing indicative flag $F_{LC}$ is set to "1". On the other hand, when the answer to step S5 is NO, or when the indicated direction and the estimated direction of lateral deviation or the sign of lateral displacement estimate XS are not same, it is determined that a driver has no intention of lane changing. Then, the routine proceeds to step S7, where lane-changing indicative flag $F_{LC}$ is set to "0".

At step S8, following step S4 in the case direction indicator switch 20 is OFF, it is determined whether direction indicator switch 20 is turned OFF from ON in the last processing interval. When the answer to step S8 is NO, or when direction indicator switch 20 is not turned OFF from ON in the last processing interval, or is kept OFF, the routine proceeds to step S11. On the other hand, when the answer to step S8 is YES, or when direction indicator switch 20 is turned OFF from ON in the last processing interval, the routine proceeds to step S9.

At step S9, it is determined whether or not a predetermined time (e.g., 4 seconds) is elapsed after direction indicator switch 20 being turned OFF. When the answer to step S9 is NO, or in the case where the predetermined time is not elapsed, the routine is put on standby until the predetermined time is elapsed. After the predetermined time is elapsed, the routine proceeds to step S10, where lane-changing indicative flag $F_{LC}$ is reset to "0".

Taking into account the driver's steering operation under a condition that direction indicator switch 20 remains turned OFF, a still further check for the presence or absence of the driver's intention for lane changing is made based on steering wheel angle a and steering wheel angle change $\Delta\sigma$. At step S11, following step S8 in the case direction indicator switch 20 is kept OFF during the predetermined time, it is determined whether or not steering wheel angle a is greater than or equal to a predetermined threshold steering wheel angle as and steering wheel angle change $\Delta\sigma$ is greater than or equal to a predetermined threshold steering wheel angle change $\Delta\sigma_S$. When the answer to step S11 is YES, or in the case of ($\sigma \geq \sigma_S$ and $\Delta\sigma \geq \Delta\sigma_S$), it is determined that a driver has an intention of lane changing. Then the routine proceeds to step S12, where lane-changing indicative flag $F_{LC}$ is set to "1". On the other hand, when the answer to step S11 is NO, or in the case of ($\sigma < \sigma_S$ or $\Delta\sigma < \Delta\sigma_S$), it is determined that a driver has no intention of lane changing. Then, the routine proceeds to step S13, where lane-changing indicative flag $F_{LC}$ is reset to "0". As discussed above, in the shown embodiment, whether a driver has an intention of lane changing is determined based on steering wheel angle $\sigma$ and steering wheel angle change $\Delta\sigma$. Alternatively, this check may be made based on the magnitude of steering torque imposed on the steering wheel.

After lane-changing indicative flag $F_{LC}$ is determined through the steps as described above, that is, steps S4 through S13, the routine proceeds to step S14, where it is determined whether or not lane-changing indicative flag $F_{LC}$ is reset to "0". When the answer to step S14 is NO, or in the case of ($F_{LC}$=1), the routine proceeds to step S15, where a lane deviation warning flag $F_{DA}$ is reset to "0", and then to step S16, where lane-deviating indicative flag $F_{LD}$ is reset to "0". On the other hand, when the answer to step S14 is YES, or in the case of ($F_{LC}$=0), the routine proceeds to step S17.

At step S17, it is determined whether or not lateral displacement estimate XS calculated through step S3 is greater than or equal to a lane deviation warning threshold displacement $X_W$. Lane deviation warning threshold displacement $X_W$ is set to a difference ($X_C$–$X_M$) between a lane deviation prevention threshold displacement $X_C$ as a determinant of starting a routine of LDP control, and a predetermined displacement $X_M$, to generate an alarm before starting a routine. When the answer to step S17 is YES, or in the case of (|XS|$\geq$$X_W$), it is determined that the host vehicle possibly tends to deviate from the current driving lane. Then, the routine proceeds to step S18, where lane deviation warning flag $F_{DA}$ is set to "1", and then to step S22. On the other hand, when the answer to step S17 is NO, or in the case of (|XS|<$X_W$), it is determined that there is a low possibility of lane deviation of the host vehicle. Then, the routine proceeds to step S19.

At step S19, it is determined whether or not lane deviation warning flag $F_{DA}$ is set to "1". When the answer to step S19 is YES, or in the case of ($F_{DA}$=1), the routine proceeds to step S20. At step S20, it is determined whether the absolute value of lateral displacement estimate XS is smaller than a difference ($X_W$–$X_H$) between lane deviation warning threshold displacement $X_W$ and a predetermined displacement $X_H$. $X_H$ represents a hysteresis for avoiding a hunting of lane-deviation alarm. When the answer to step S20 is YES, or in the case of (|XS|<($X_W$–$X_H$)), it is determined that there is a low possibility of lane deviation. Then, the routine proceeds to step S21, where lane deviation warning flag $F_{DA}$ is reset to "0", and then to step S22. On the other hand, when the answer to step S19 is NO, or in the case of ($F_{DA}$=0), that is, when it is determined that there is a low possibility of lane deviation, the routine proceeds to step S22 with lane deviation warning flag $F_{DA}$ reset="0". When the answer to step S20 is NO, or when (|XS|$\geq$($X_W$–$X_H$)) is determined through step S20, it is determined that lateral displacement estimate XS is just temporarily decreased. Then, the routine proceeds to step S22 with lane deviation warning flag $F_{DA}$ set to "1".

At step S22, it is determined whether or not the absolute value of lateral displacement estimate XS is greater than or equal to lane deviation prevention threshold displacement $X_C$. Lane deviation prevention threshold displacement $X_C$ may be a constant such as 0.8 m, or a variable such as a function of a driving lane width L and a host vehicle width $L_C$ as shown in the following equation (2).

$$X_C = \min[L/2 - Lc/2, 0.8] \qquad (2)$$

Incidentally, driving lane width L may be derived from an image captured by CCD camera 13, from a road map of a navigation system, or if possible, from information received from an infrastructure such as a beacon. When the answer to step S22 is YES, or in the case of (|XS|$\geq$$X_C$), it is determined that the host vehicle is on the verge of lane deviating, or in other words, it is determined that there is a possibility of imminent lane deviation of the vehicle. Then the routine proceeds to step S23, where lane-deviating indicative flag $F_{LD}$ is set to "1". On the other hand, when the answer to step S22 is NO, or in the case of (|XS|<$X_C$), the routine proceeds to step S16, where lane-deviating indicative flag $F_{LD}$ is reset to "0". After lane-deviating indicative flag $F_{LD}$ is determined through step S16 or S23, the routine proceeds to step S24.

At step S24, it is determined whether or not lane deviation warning flag $F_{DA}$ is set to "1". When the answer to step S24 is YES, or in the case of ($F_{DA}$=1), the routine proceeds to step S25, and then to step S26. On the other hand, when the answer to step S24 is NO, or in the case of ($F_{DA}$=0), the routine proceeds directly to step S26.

Figure 3:
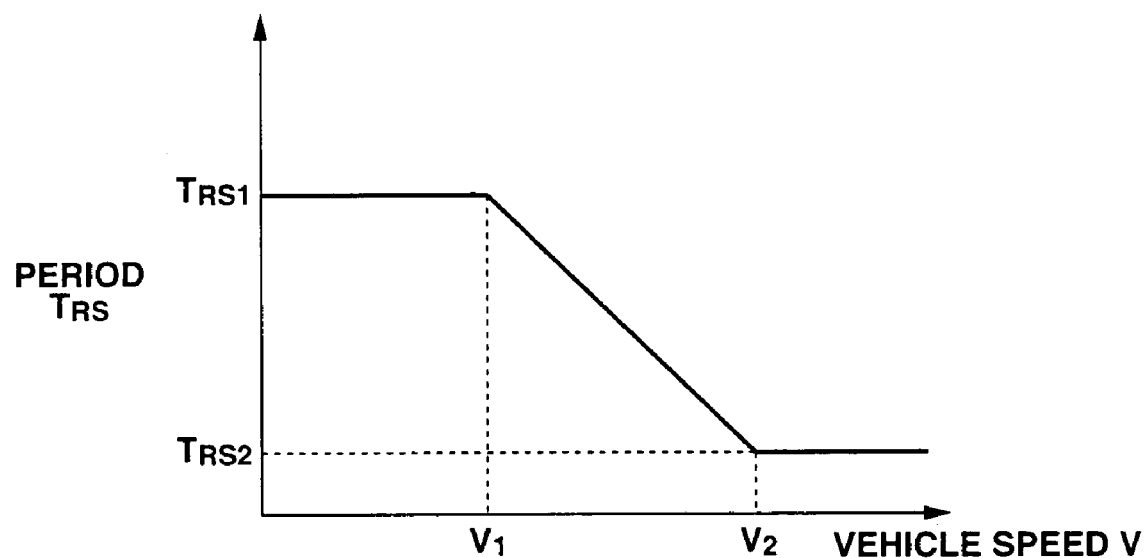
FIG. 3 is a map for deriving a period $T_{RS}$ of oscillation pattern of hydraulic brake pressure.
Figure 4:
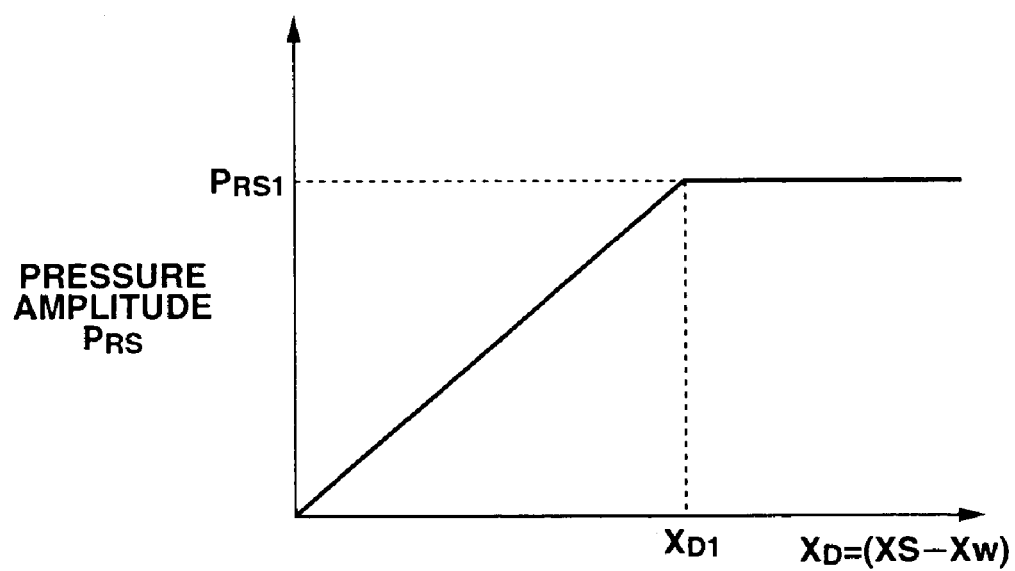
FIG. 4 is a map for deriving a pressure amplitude $P_{RS}$ of oscillation pattern of hydraulic brake pressure.

At step S25, an oscillation pattern with which the host vehicle is vibrated for a waning of lane deviation is determined. The vibrations in the vehicle are generated by producing fluctuations in a road wheel speed, that is, by fluctuating wheel torque or hydraulic brake pressure in a related wheel brake cylinder. Concretely, a period $T_{RS}$ and a pressure amplitude $P_{RS}$ of the oscillation pattern of fluctuations in hydraulic brake pressure is calculated. Period $T_{RS}$ of hydraulic brake pressure is derived from a map as shown in FIG. 3. The map for deriving period $T_{RS}$ has a horizontal axis of host vehicle speed V and a vertical axis of period $T_{RS}$. Period $T_{RS}$ is set to a comparatively long constant period $T_{RS1}$ while host vehicle speed V varies from zero to a predetermined speed $V_1$. Period $T_{RS}$ decreases from period $T_{RS1}$ to a comparatively short period $T_{RS2}$, as host vehicle speed V increases from predetermined speed $V_1$ to a predetermined speed $V_2$. With host vehicle speed V lager than predetermined speed $V_2$, period $T_{RS}$ is set to period $T_{RS2}$. Pressure amplitude $P_{RS}$ of hydraulic brake pressure is derived from a map as shown in FIG. 4. The map for deriving pressure amplitude $P_{RS}$ has a horizontal axis of a difference $X_D(=|XS|-X_W)$ between the absolute value of lateral displacement estimate XS and lane deviation warning threshold displacement $X_W$, and a vertical axis of pressure amplitude $P_{RS}$. Pressure amplitude $P_{RS}$ increases from zero to a predetermined pressure amplitude $P_{RS1}$, as $X_D$ increases from zero to a predetermined distance $X_{D1}$. With $X_D$ lager than predetermined distance $X_{D1}$, predetermined pressure amplitude $P_{RS}$ is set to pressure amplitude $P_{RS1}$.

At step S26, it is determined whether or not lane-deviating indicative flag $F_{LD}$ is set to "1". When the answer to step S26 is YES, or in the case of ($F_{LD}$=1), the routine proceeds to step S27, and then to step S29. On the other hand, when the answer to step S26 is NO, or in the case of ($F_{LD}$=0), the routine proceeds to step S28, and then to step S29.

At step S27, a desired yawing moment Ms, which is desired to be applied to the host vehicle in the direction of preventing lane deviation, is calculated from the following equation (3) with lateral displacement estimate XS. Desired yawing moment Ms is positive counter-clockwise, and negative clockwise when looking from the top view.

$$Ms = -K1 \cdot K2 \cdot (XS - X_C) \quad (3)$$

where K1 represents a constant determined by the specifications of the host vehicle, and K2 represents a gain varying with host vehicle speed V. In the equation (3), $X_C$ is a positive value in the left direction, and a negative value in the right direction. K2 is derived from a map as shown in FIG. 5. The map for deriving gain K2 has a horizontal axis of host vehicle speed V and a vertical axis of gain K2. Gain K2 is set to a comparatively large constant gain $K2_H$ while host vehicle speed V varies from zero to a predetermined speed $V_3$. Gain K2 decreases from gain $K2_H$ to a comparatively small gain $K2_L$, as host vehicle speed V increases from predetermined speed $V_3$ to a predetermined speed $V_4$. With host vehicle speed V lager than predetermined speed $V_4$, gain K2 is set to gain $K2_L$. On the other hand, at step S28, following step S26 in the case of ($F_{LD}$=0), desired yawing moment Ms is set to zero.

At step S29, it is determined whether or not lane deviation warning flag $F_{DA}$ and lane-deviating indicative flag $F_{LD}$ are both reset to "0". When the answer to step S29 is YES, or in the case of ($F_{DA}$=0 and $F_{LD}$=0), the routine proceeds to step S30, and then to step S41. On the other hand, when the answer to step S29 is NO, or in the case of ($F_{DA}$=1 or $F_{LD}$=1), the routine proceeds to step S31.

At step S30, left an right desired front wheel brake cylinder pressures $Ps_{FL}$ and $Ps_{FR}$ are set to master cylinder pressure Pm, and desired left and right rear wheel brake cylinder pressures $Ps_{RL}$ and $Ps_{RR}$ are set to a rear wheel master cylinder pressure Pmr, which is calculated from master cylinder pressure Pm in consideration of front-rear distribution of hydraulic brake pressure, from the following equation (4).

$Ps_{FL} = Ps_{FR} = Pm$ $Ps_{RL} = Ps_{RR} = Pmr \quad (4)$

At step S31, it is determined whether or not lane-deviating indicative flag $F_{LD}$ is reset to "0". When the answer to step S31 is YES, or in the case of ($F_{LD}$=0), indicating that lane deviation warning flag $F_{DA}$ is set to "1", the routine proceeds to step S32. On the other hand, when the answer to step S31 is NO, or in the case of ($F_{LD}$=1), the routine proceeds to step S35.

At step S32, it is determined whether or not the direction of lane deviation is left, that is, lateral displacement estimate XS is a positive value. When the answer to step S32 is YES, or when it is determined that the direction of lane deviation is left or (XS>0), the routine proceeds to step S33. On the other hand, when the answer to step S32 is NO, or when it is determined that the direction of lane deviation is right or (XS<0), the routine proceeds to step S34.

At step S33, desired left and right front wheel brake cylinder pressures $Ps_{FL}$ and $Ps_{FR}$ are set to master cylinder pressure Pm, desired left rear wheel brake cylinder pressure $Ps_{RL}$ is set to a sum of rear wheel master cylinder pressure Pmr and pressure amplitude $P_{RS}$ calculated through step S25, and desired right rear wheel brake cylinder pressure $Ps_{RR}$ is set to rear wheel master cylinder pressure Pmr, from the following equation (5).

$Ps_{FL} = Ps_{FR} = Pm$ $Ps_{RL} = Pmr + P_{RS}$ $Ps_{RR} = Pmr \quad (5)$

At step S34, desired left and right front wheel brake cylinder pressures $Ps_{FL}$ and $Ps_{FR}$ are set to master cylinder pressure Pm, desired left rear wheel brake cylinder pressure $Ps_{RL}$ is set to rear wheel master cylinder pressure Pmr, and desired right rear wheel brake cylinder pressure $Ps_{RR}$ is set to a sum of rear wheel master cylinder pressure Pmr and pressure amplitude $P_{RS}$, from the following equation (6).

$Ps_{FL} = Ps_{FR} = Pm$ $Ps_{RL} = Pmr$ $Ps_{RR} = Pmr + P_{RS} \quad (6)$

At step S35, following step S31 in the case of ($F_{LD}$=1), it is determined whether or not the absolute value of desired yawing moment Ms is smaller than a predetermined threshold yawing moment Ms1. When the answer to step S35 is YES, or in the case of (|Ms|<Ms1), the routine proceeds to step S36. On the other hand, when the answer to step S35 is NO, or in the case of (|Ms|≧Ms1), the routine proceeds to step S37.

At step S36, a desired front wheel brake cylinder pressure difference $\Delta Ps_F$ between front wheel brake cylinders 6FL and 6FR is set to zero from the following equation (7), and a desired rear wheel brake cylinder pressure difference $\Delta Ps_R$ between rear wheel brake cylinders 6RL and 6RR is set from the following equation (8).

$\Delta Ps_F = 0 \quad (7)$ $\Delta Ps_R = 2 \cdot K_{BR} \cdot |Ms|/Tr \quad (8)$ where Tr represents a wheel tread of the host vehicle that is same at both the front and the rear in the shown embodiment, and $K_{BR}$ represents a predetermined conversion factor used to convert the braking force generated by a rear brake to the hydraulic brake pressure in a rear wheel brake cylinder. A conversion factor is determined by the specifications of a brake system.

At step S37, following step S35 in the case of (|Ms|≧Ms1), desired front wheel brake cylinder pressure difference $\Delta Ps_F$ is set from the following equation (9), and desired rear wheel brake cylinder pressure difference $\Delta Ps_R$ is set from the following equation (10).

$$\Delta Ps_F = 2 \cdot K_{BF} \cdot K_{FH} \cdot |Ms|/Tr \qquad (9)$$

$$\Delta Ps_R = 2 \cdot K_{BR} \cdot (1\text{-}31 K_{FH}) \cdot |Ms|/Tr \qquad (10)$$

where $K_{FH}$ represents a front-side proportion of the yawing moment.

After desired front wheel brake cylinder pressure difference $\Delta Ps_F$ and desired rear wheel brake cylinder pressure difference $\Delta Ps_R$ are calculated through step S36 or S37, the routine proceeds to step S38. At step S38, it is determined whether or not the direction of avoiding lane deviation is right (the direction of lane deviation is left), that is, desired yawing moment Ms is a negative value. When the answer to step S38 is YES, or when it is determined that the direction of avoiding lane deviation is right or (Ms<0), the routine proceeds to step S39. On the other hand, when the answer to step S38 is NO, or when it is determined that the direction of avoiding lane deviation is left or (Ms>0), the routine proceeds to step S40.

At step S39, desired left front wheel brake cylinder pressure $Ps_{FL}$ is set to master cylinder pressure Pm, desired right front wheel brake cylinder pressure $Ps_{FR}$ is set to a sum of master cylinder pressure Pm and desired front wheel brake cylinder pressure difference $\Delta Ps_F$, desired left rear wheel brake cylinder pressure $Ps_{RL}$ is set to a sum of rear wheel master cylinder pressure Pmr and pressure amplitude $P_{RS}$, and desired right rear wheel brake cylinder pressure $Ps_{RR}$ is set to a sum of rear wheel master cylinder pressure Pmr and desired rear wheel brake cylinder pressure difference $\Delta Ps_R$, from the following equation (11).

$$Ps_{FL} = Pm$$

$$Ps_{FR} = Pm + \Delta Ps_F$$

$$Ps_{RL} = Pmr + P_{RS}$$

$$Ps_{RR} = Pmr + \Delta Ps_R \qquad (11)$$

At step S40, desired left front wheel brake cylinder pressure $Ps_{FL}$ is set to a sum of master cylinder pressure Pm and desired front wheel brake cylinder pressure difference $\Delta Ps_F$, desired right front wheel brake cylinder pressure $Ps_{FR}$ is set to master cylinder pressure Pm, desired left rear wheel brake cylinder pressure $Ps_{RL}$ is set to a sum of rear wheel master cylinder pressure Pmr and desired rear wheel brake cylinder pressure difference $\Delta Ps_R$, and desired right rear wheel brake cylinder pressure $Ps_{RR}$ is set to a sum of rear wheel master cylinder pressure Pmr and pressure amplitude $P_{RS}$, from the following equation (12).

$$Ps_{FL} = Pm + \Delta Ps_F$$

$$Ps_{FR} = Pm$$

$$Ps_{RL} = Pmr + \Delta Ps_R$$

$$Ps_{RR} = Pmr + P_{RS} \qquad (12)$$

After desired wheel brake cylinder pressures $Ps_{FL}$ through $Ps_{RR}$ are calculated through step S30, S33, S34, S39, or S40, the routine proceeds to step S41. At step S41, it is determined whether or not lane-deviating indicative flag $F_{LD}$ is set to "1". When the answer to step S41 is YES, or in the case of ($F_{LD}$=1), the routine proceeds to step S42, and then to step S44. On the other hand, when the answer to step S41 is NO, or in the case of ($F_{LD}$=0), the routine proceeds to step S43, then to step S44.

At step S42, a desired driving torque Trq is calculated from the following equation (13).

$$Trq = f(Acc) - g(Ps) \qquad (13)$$

where Ps represents a sum of desired front wheel brake cylinder pressure difference $\Delta Ps_F$ and desired rear wheel brake cylinder pressure difference $\Delta Ps_R$ (Ps=$\Delta Ps_F + \Delta Ps_R$), f(Acc) represents a function that derives a part of desired driving torque Trq according to accelerator opening Acc, and g(Ps) represents a function that derives a braking torque generated by the LDP control. On the other hand, at step S43, desired driving torque Trq is calculated from the following equation (14).

$$Trq = f(Acc) \qquad (14)$$

After desired driving torque Trq is calculated through step S42 or S43, the routine proceeds to step S44.

At step S44, desired wheel brake cylinder pressures $Ps_{FL}$ through $Ps_{RR}$ are output to hydraulic modulator 7, and desired driving torque Trq is output to driving torque controller 12. Then, the routine returns to step S1.

Steps S24, S25, S32 through S34, S38 through S40, and S44 serve for a wheel torque control section of control unit 8 programmed to control fluctuations in the wheel torque to control the fluctuations in the road wheel speed. Steps S3 through S23 serve for a deviation determination section of control unit 8 programmed to determine a degree of lane deviation of the vehicle from a current driving lane and to determine whether there is a possibility of lane deviation of the vehicle. Hydraulic modulator 7 and driving torque controller 12 serve for a wheel actuator for regulating wheel torque comprised of braking torque and driving torque. Steps S26 through S28, S29 through S31, S35 through 540 and S44 serve for a deviation prevention section of control unit 8 programmed to control a yawing moment applied to the vehicle in a direction opposite to a direction of a potential lane deviation.

Next, the following describes an actual operation of the lane deviation prevention system of the first embodiment. While the host vehicle is traveling along the current driving lane, lane deviation warning flag $F_{DA}$ and lane-deviating indicative flag $F_{LD}$ are both reset to "0" (steps S15 and S16). Desired wheel brake cylinder pressures $Ps_{FL}$ through $Ps_{RR}$ are each regulated to master cylinder pressure Pm or rear wheel master cylinder pressure Pmr according to a driver's manual braking operation of the brake pedal (step S30). Thus, the host vehicle is controlled based on manual operation of the steering wheel, the accelerator pedal, and the brake pedal.

When the host vehicle begins to deviate from the central position of the current driving lane from the above mentioned cruising state, and then the absolute vale of lateral displacement estimate XS exceeds lane deviation warning threshold displacement $X_W$, it is determined that the host vehicle possibly deviate from the current driving lane, and lane deviation warning flag $F_{DA}$ is set to "1" for alarming the driver of lane deviation (step S18). With lane deviation warning flag $F_{DA}$ set to "1", period $T_{RS}$ and pressure amplitude $P_{RS}$, which defines pressure fluctuation in desired wheel brake cylinder pressures $Ps_{FL}$ through $Ps_{RR}$ are determined, for generating artificial vibrations as if the host vehicle is passing on a rumble strip to warn the driver (step S25). Period $T_{RS}$ is decreased as host vehicle speed V increases, so that a realistic vibration is provided. Pressure amplitude $P_{RS}$ is increased as the excess of lateral displacement estimate XS over lane deviation warning threshold displacement $X_W$ increases.

Desired wheel brake cylinder pressures $Ps_{FL}$ through $Ps_{RR}$ in wheel brake cylinders 6FL through 6RR are set and output to hydraulic modulator 7 to produce and supply the defined pressure fluctuation to the rear road wheel brake cylinder of the side of lane deviation and master cylinder pressure Pm and rear wheel master cylinder pressure Pmr according to manual brake operation of the driver to each road wheel brake cylinder (steps S32 through S24, and S44).

Thus, when the host vehicle tends to deviate to the right and lateral displacement estimate XS exceeds lane deviation warning threshold displacement $X_W$, the braking force applied to right rear road wheel 5RR is fluctuated at period $T_{RS}$ according to host vehicle speed V. In the case lateral displacement estimate XS changes as shown in FIG. 6A, a fluctuation of desired right rear wheel brake cylinder pressure $Ps_{RR}$ is small just after lateral displacement estimate XS exceeds lane deviation warning threshold displacement $X_W$, and is increased with lateral displacement estimate XS.

The vibration simulating a rumble strip immediately and assuredly informs the driver of the tendency of lane deviation of the host vehicle, and urges the driver to operate the steering wheel in the direction of preventing lane deviation. When the driver corrects steering operation so that lateral displacement estimate XS decreased under lane deviation warning threshold displacement $X_W$ and lane deviation warning flag $F_{DA}$ is reset to "0", the warning of lane deviation that fluctuates rotation speeds of road wheels to vibrate the host vehicle body is terminated.

On the other hand, when the lateral displacement of the host vehicle rapidly increases or the driver's response is delayed to increase lateral displacement estimate XS further more than lane deviation prevention threshold displacement $X_C$, it is determined that the host vehicle is on the verge of lane deviating, and then lane-deviating indicative flag $F_{LD}$ is set to "1" (step S23). With lane-deviating indicative flag $F_{LD}$ set to "1", desired yawing moment Ms that is required for correcting the course of the host vehicle in the direction of avoiding deviation is calculated based on lateral displacement estimate XS (step S27). Then, desired front and rear wheel brake cylinder pressure differences $\Delta Ps_F$ and $\Delta Ps_R$ required for generating desired yawing moment Ms (steps S35 through S37). When desired yawing moment Ms is smaller than predetermined threshold yawing moment Ms1, only desired rear wheel brake cylinder pressure difference $\Delta Ps_R$ is set. On the other hand, when desired yawing moment Ms is greater than or equal to predetermined threshold yawing moment Ms1, both desired wheel brake cylinder pressure differences $\Delta Ps_F$ and $\Delta Ps_R$ are set.

Front and rear desired wheel brake cylinder pressure differences $\Delta Ps_F$ and $\Delta Ps_R$ are applied to the wheel brake cylinders of the side of the deviating direction. Additionally, the pressure fluctuations defined by period $T_{RS}$ and pressure amplitude $P_{RS}$ are applied to the rear wheel brake cylinder of the side of the deviation direction. Master cylinder pressure Pm and rear wheel master cylinder pressure Pmr are also applied to the wheel brake cylinders according to driver's manual braking operations of the brake pedal. These combination, or desired wheel brake cylinder pressures $Ps_{FL}$ through $Ps_{RR}$ in wheel brake cylinders 6FL through 6RR are determined (steps S38 through S40), and then output to hydraulic modulator 7 (step S44).

When the driver operates the accelerator pedal, an acceleration of the vehicle is suppressed by the LDP control. Desired driving torque Trq is calculated by subtracting the braking torque generated at the LDP control from the driving torque according to driver's manual operations of the accelerator pedal, and then is output to driving torque controller 12 (step S42).

The LDP control is thus operated, that is, by suppressing the acceleration of the host vehicle, generating a vibration as if the host vehicle is passing on a rumble strip to urge the driver to steer in the direction of avoiding deviation, and generating a yawing moment in the direction of avoiding deviation. When correction of the course by an operation of the driver or by the LDP control decreases lateral displacement estimate XS less than lane deviation warning threshold displacement $X_W$ and lane deviation warning flag $F_{DA}$ and lane-deviating indicative flag $F_{LD}$ are reset to "0", the warning of lane deviation and the LDP control are terminated.

The following describes effects of the shown embodiment. The host vehicle is vibrated by fluctuating the wheel speeds, for warning a driver according to the driving state of the host vehicle. This warning operation allows the driver to recognize immediately and assuredly the alarm of lane deviation. In addition, the fluctuation of the wheel speeds for the vibration of the host vehicle is achieved by fluctuating breaking force. This needs no additional device for the control, thereby leads to no cost up, if the vehicle is equipped with a stability control system, for example, a vehicle dynamics control (VDC) system capable of controlling the braking force.

When the vibration of the vehicle is applied, period $T_{RS}$ of a fluctuation of braking force is determined based on host vehicle speed V. This provides a realistic vibration as if the host vehicle is passing on an actual rumble strip. In addition, pressure amplitude $P_{RS}$ of a fluctuation of hydraulic brake pressure is determined based on a degree of deviation from the driving lane, that is, lateral displacement estimate XS. With this control, when the degree of deviation is great, braking force is fluctuated to great extent for strongly calling the driver's attention. Furthermore, the braking force is fluctuated at the road wheel of the side of the direction of deviation. This also provides a realistic vibration as if the host vehicle is passing on an actual rumble strip.

The possibility of lane deviation is determined by estimating a future lateral displacement from the central position of the driving lane of the host vehicle, or lateral displacement estimate XS, based on at least the variables of host vehicle speed V, yaw angle φ of the host vehicle from the direction of the driving lane, and trajectory curvature β. When lateral displacement estimate XS is greater than or equal to lane deviation warning threshold displacement $X_W$, it is determined that the host vehicle possibly deviates from the driving lane. This allows precise estimation of the degree of lane deviation.

The hydraulic brake pressures in the wheel brake cylinders are each separately controlled, independently of manual brake operation of the driver. This allows a precise control of each braking force. When it is determined that the host vehicle possibly deviates from the driving lane, the LDP control warns the driver by vibrating the vehicle body, and prevents lane deviation of the host vehicle by correcting the host vehicle course in the direction of avoiding lane deviation. This allows the driver to recognize the tendency of lane deviation of the host vehicle immediately and assuredly. Additionally, a potential increase of the degree of lane deviation of the vehicle until the driver corrects steering operation is suppressed, which allows to enhance the vehicle safety.

The LDP control corrects the host vehicle course by applying yawing moment to the host vehicle in the direction of avoiding lane deviation with wheel brake cylinder pressure difference between the left and the right. With this process, control of braking force for both preventing lane deviation and warning is controlled by only hydraulic modulator 7, which leads to suppression of cost up.

In the shown embodiment, vibrating the vehicle body as a warning of lane deviation is achieved by oscillating the rear wheel brake cylinder pressure, since the rear brake unit is smaller than the front brake so that the rear brake unit is more responsive and is suitable for generating a pressure fluctuation with a high frequency. However, alternatively, the front wheel brake cylinder pressure may be oscillated for warning of lane deviation.

In the shown embodiment, the warning of lane deviation is achieved by oscillating only the rear wheel brake cylinder pressure of the side of deviation. However, the number of road wheels where wheel brake cylinder pressures are oscillated may be varied according to at least one of host vehicle speed V and lateral displacement estimate XS as a degree of lane deviation. When host vehicle speed V is high or lateral displacement estimate XS is great, the number of road wheels where wheel brake cylinder pressures are oscillated may be increased so that the vibration of the vehicle is increased to call the driver's attention strongly. In the case the number of road wheels where wheel brake cylinder pressures are fluctuated is increased, it is preferable to oscillate left and right rear wheels so that the effect of preventing lane deviation is ensured. For example, when the host vehicle is deviating in the left direction, the desired wheel brake cylinder pressures $Ps_{FL}$ through $Ps_{RR}$ are derived from the following equation (15).

$$Ps_{FL}=Pm$$

$$Ps_{FR}=Pm+\Delta Ps_F$$

$$Ps_{RL}=Pmr+P_{RS}$$

$$Ps_{RR}=Pmr+\Delta Ps_R+P_{RS} \quad (15)$$

On the other hand, when the host vehicle is deviating in the right direction, the desired wheel brake cylinder pressures are derived from the following equation (16).

$$Ps_{FL}=Pm+\Delta Ps_F$$

$$Ps_{FR}=Pm$$

$$Ps_{RL}=Pmr+\Delta Ps_R+P_{RS}$$

$$Ps_{RR}=Pmr+P_{RS} \quad (16)$$

In the shown embodiment, period $T_{RS}$ of braking force fluctuation is determined according to host vehicle speed V. Alternatively, period $T_{RS}$ of braking force fluctuation may be varied according to other variables such as lateral displacement estimate XS. In the case period $T_{RS}$ is shortened as lateral displacement estimate XS increases, the warning is capable of strongly calling the driver's attention. As a matter of course, period $T_{RS}$ may be varied according to both host vehicle speed V and lateral displacement estimate XS.

In the shown embodiment, pressure amplitude $P_{RS}$ of braking force fluctuation is determined according to lateral displacement estimate XS. Alternatively, pressure amplitude $P_{RS}$ of braking force fluctuation may be varied according to other variables such as host vehicle speed V. In the case pressure amplitude $P_{RS}$ is increased as host vehicle speed V increases, the warning is capable of strongly calling the driver's attention. As a matter of course, pressure amplitude $P_{RS}$ may be varied according to both host vehicle speed V and lateral displacement estimate XS.

Figure 7:
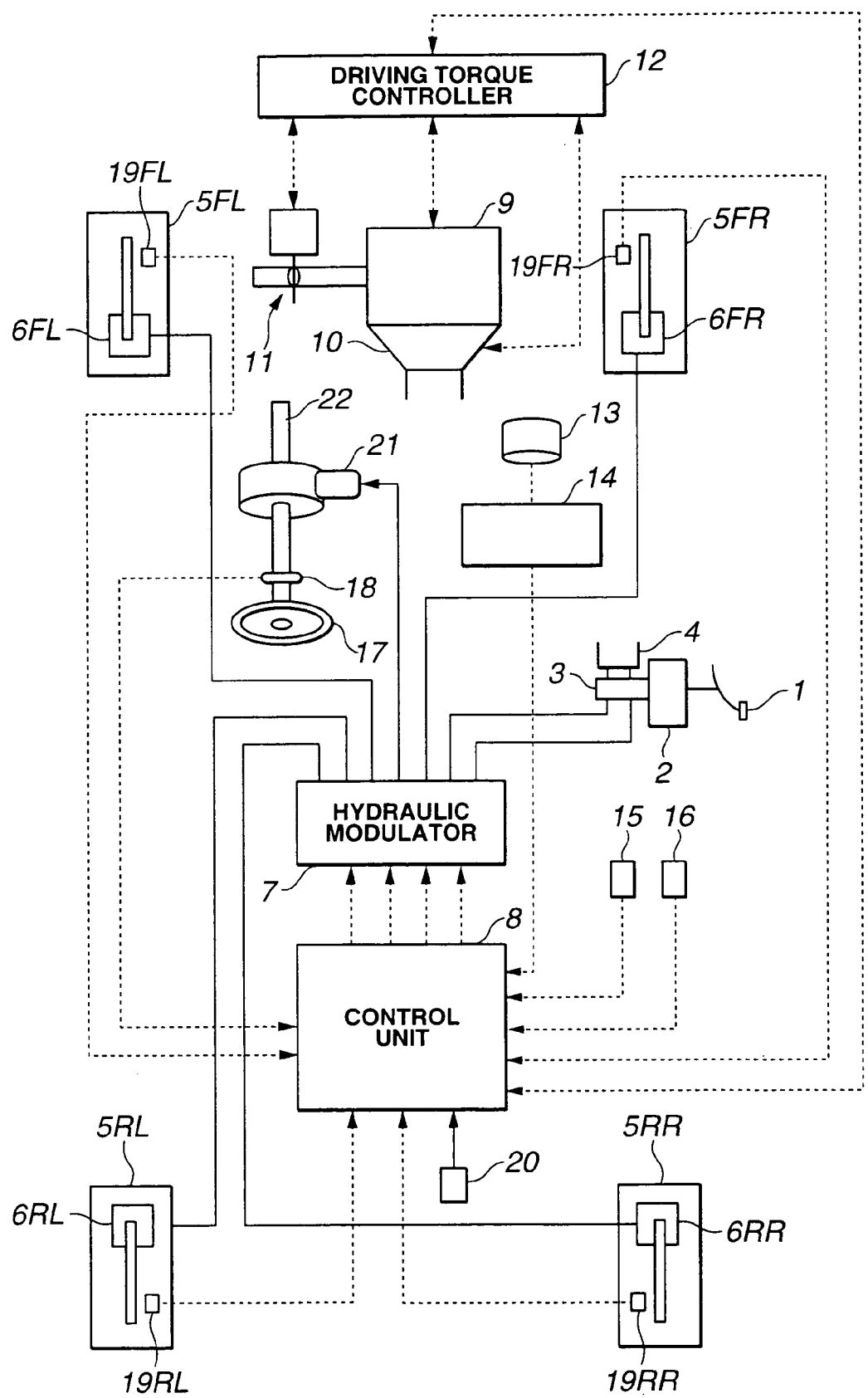
FIG. 7 is a block diagram depicting a lane deviation prevention system with a warning system with vibration of a variation of the first embodiment.

In the shown embodiment, when it is determined that the host vehicle is on the verge of lane deviating, the course is corrected by applying yawing moment to the host vehicle with the wheel brake cylinder pressure difference between the left and the right. Alternatively, as shown in FIG. 7, the LDP system may be include a steering actuator 21 operatively associated with steering shaft 22 and connected electrically to control unit 8 for regulating an additional steering torque in the direction of avoidance imposed on steering shaft 22 to correct the host vehicle course. With this structure, the host vehicle is prevented from lane deviating without being decelerated. With reference to the operation of the system, the control sequence is comprised by omitting steps S26 through S28, S31, and S35 through S40, and adding an operation of calculating a desired steering torque Ts in the direction of avoidance when lane-deviating indicative flag $F_{LD}$ is set to "1", and an operation of applying desired steering torque Ts to steering shaft 22, based on the routine as shown in FIGS. 2A and 2B.

In the shown embodiment, the host vehicle is vibrated by generating fluctuations in breaking force. Additionally or alternatively, the host vehicle may be vibrated by generating fluctuations in driving force. Wheel torque, that is, braking torque and driving torque applied to a road wheel is regulated by a wheel actuator such as a hydraulic modulator and a driving torque controller, for variably adjusting road wheel speed of a road wheel.

In the shown embodiment, the host vehicle is vibrated, when it is determined that the host vehicle possibly deviates from the driving lane. Alternatively, the system of generating vibration may be applied to any other warning system.

Figure 8A:
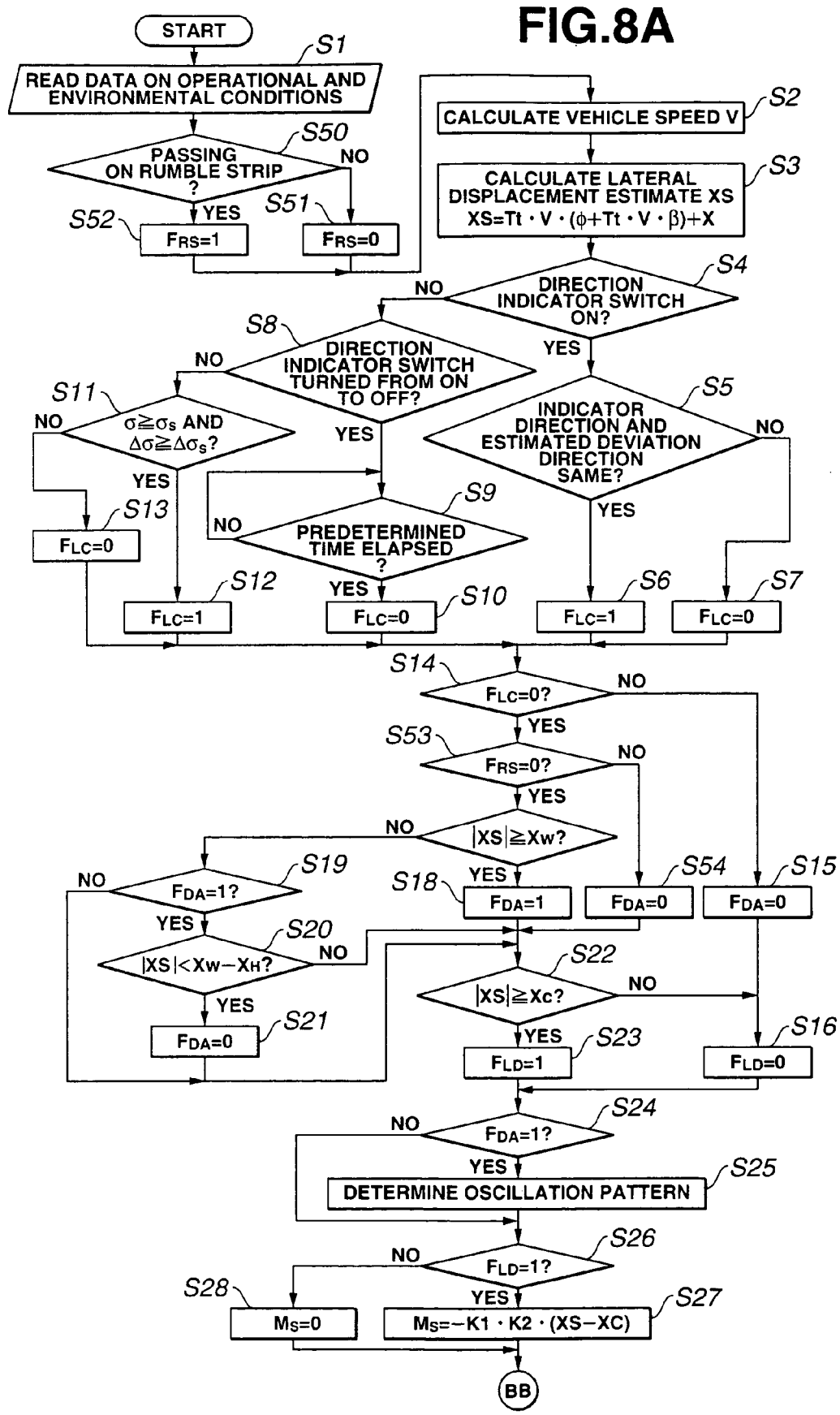
FIG. 8A is the first half of a flow chart depicting a routine of LDP control of a second embodiment.
Figure 8B:
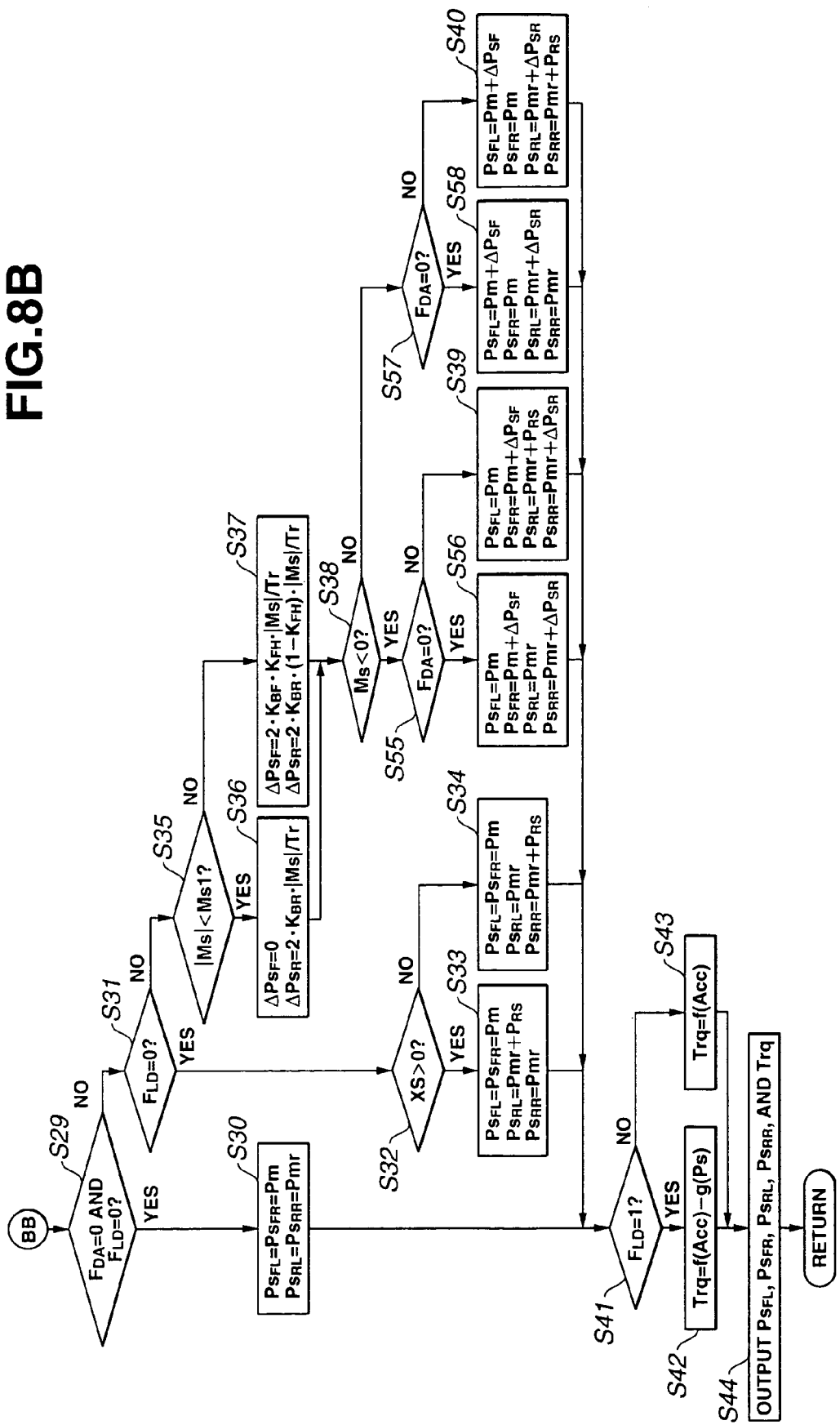
FIG. 8B is the second half of the flow chart depicting the routine of LDP control of the second embodiment.

Next, referring now to FIGS. 8A through 12E, there is shown a second embodiment of the present invention. In this embodiment, the vibration generated by fluctuation in braking force is not applied, or is inhibited while the host vehicle is passing on an actual rumble strip with road irregularities continuously provided on a road shoulder. The LDP control is operated as shown in FIGS. 8A and 8B, which is comprised by adding steps S50 through S58 to the routine of the first embodiment as shown in FIGS. 2A and 2B. The steps in common are represented by the same reference signs.

Figure 9:
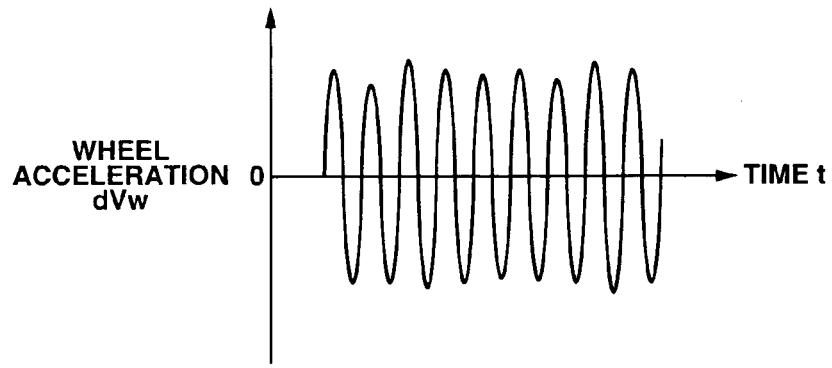
FIG. 9 is a time chart of a wheel acceleration dVw during passing on a rumble strip.

The following describes the operation of the system, focusing on the added steps. After the data is read through step S1, the routine proceeds to step S50. At step S50, it is determined whether or not the host vehicle is passing on a rumble strip with road irregularities that is continuously provided on the sides of a road. The following describes the process of the determination in detail. With the road wheel on the rumble strip, the wheel acceleration fluctuates at a constant period, as shown in FIG. 9. The property of fluctuation in the wheel acceleration is related to the separation of the irregularities or the properties of tire and suspension. Regardless of this effect, the wheel acceleration periodically fluctuates. Accordingly, in the shown embodiment, whether the host vehicle is passing on a rumble strip is determined based on the determination whether fluctuations in the wheel acceleration is periodic with an amplitude greater than a threshold acceleration during a duration longer than a threshold duration. First, a wheel acceleration dVw of each road wheel is calculated from the following equation (17).

$$DVw=Kg\cdot(Vw(n-1)-Vw(n))/\Delta T \quad (17)$$

where Kg represents a conversion factor, Vw(n−1) represents a wheel speed read through the previous detection, Vw(n) represents a wheel speed read through the current detection, and ΔT represents a calculation period or detection interval (e.g., 20 msec).

When wheel acceleration dVw exceeds a threshold acceleration S, a counter T is set to a predetermined initial counter value Tset. Counter T is decremented at each calculation period. Thus, elapsed time after wheel acceleration dVw exceeds threshold acceleration S is measured. With counter T decremented from initial counter value Tset, when wheel acceleration dVw exceeds threshold acceleration S again and counter T is greater than or equal to zero and less than or equal to a predetermined value $T_1 (0 \leq T \leq T_1)$, counter T is set to initial counter value Tset and begins to be decremented again.

Figure 10:
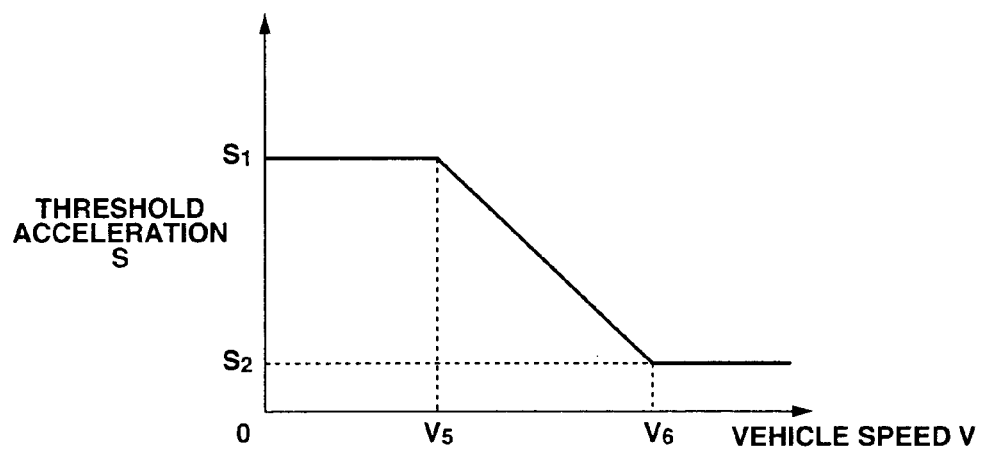
FIG. 10 is a map for deriving a threshold acceleration S.
Figure 11:
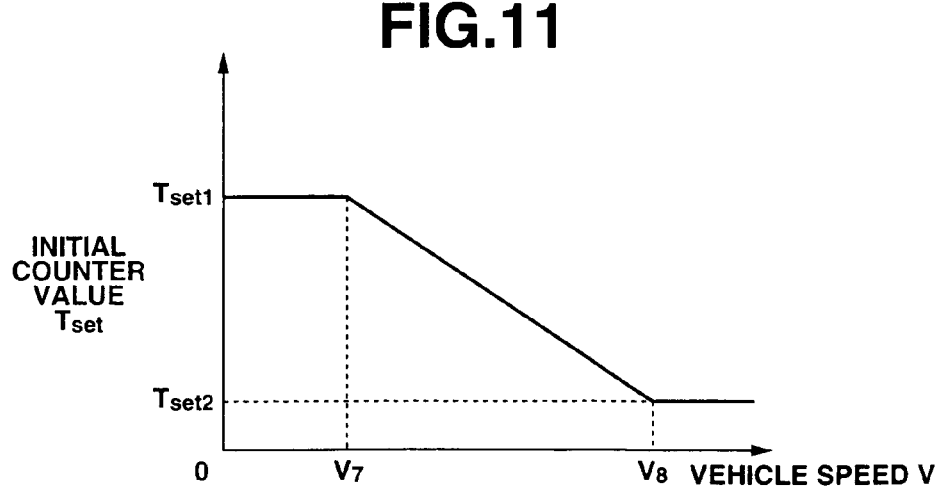
FIG. 11 is a map for deriving an initial counter value T set.

Threshold acceleration S is derived from a map as shown in FIG. 10, according to host vehicle speed V. The map for deriving threshold acceleration S has a horizontal axis of host vehicle speed V and a vertical axis of threshold acceleration S. Threshold acceleration S is set to a comparatively large constant acceleration $S_1$ while host vehicle speed V varies from zero to a predetermined speed $V_5$. Threshold acceleration S decreases from acceleration $S_1$ to a comparatively small acceleration $S_2$, as host vehicle speed V increases from predetermined speed $V_5$ to a predetermined speed $V_6$. With host vehicle speed V lager than predetermined speed $V_6$, threshold acceleration S is set to acceleration $S_2$. Initial counter value Tset is derived from a map as shown in FIG. 11, according to host vehicle speed V. The map for deriving initial counter value Tset has a horizontal axis of host vehicle speed V and a vertical axis of initial counter value Tset. Initial counter value Tset is set to a comparatively large constant initial counter value $Tset_1$ while host vehicle speed V varies from zero to a predetermined speed $V_7$. Initial counter value Tset decreases from initial counter value $Tset_1$ to a comparatively small initial counter value $Tset_2$, as host vehicle speed V increases from predetermined speed $V_7$ to a predetermined speed $V_8$. With host vehicle speed V lager than predetermined speed $V_8$, initial counter value Tset is set to initial counter value $Tset_2$.

With counter T decremented from predetermined initial counter value Tset to a value greater than zero and less than or equal to initial counter value Tset (0<T<Tset), a counter flag $F_C$ is set to "1". Accordingly, in the case wheel acceleration dVw exceeds threshold acceleration S and exceeds threshold acceleration again between a time that elapses (Tset−$T_1$) after the initial excess and a time that elapses initial counter value Tset, that is, in the case the wheel acceleration periodically fluctuates, counter flag $F_C$ is held set to "1". When counter flag $F_C$ is set to "1" from "0", a timer $T_C$ is reset to "0" and begins to be incremented at each calculation sequence. Thus timer $T_C$ measures a duration of ($F_C$=1).

Finally, it is determined whether or not timer $T_C$ is greater than or equal to a predetermined value $T_{C1}$. In the case of ($T_C < T_{C1}$), it is determined that the host vehicle is not passing on the rumble strip. Then, the routine proceeds to step S51, where a rumble strip passing indicative flag $F_{RS}$ is reset to "0". On the other hand, in the case of ($T_C \geq T_{C1}$), where the wheel acceleration continuously fluctuates, it is determined that the host vehicle is passing on the rumble strip. Then, the routine proceeds to step S52, where rumble strip passing indicative flag $F_{RS}$ is set to "1". After rumble strip passing indicative flag $F_{RS}$ is determined through step S51 or S52, the routine proceeds to step S2.

When it is determined that lane-changing indicative flag $F_{LC}$ is set to "0" through step S14, the routine proceeds to step S53. At step S53, it is determined whether or not rumble strip passing indicative flag $F_{RS}$ is reset to "0". When the answer to step S53 is YES, or in the case of ($F_{RS}$=0), the routine proceeds to step S17. On the other hand, when the answer to step S53 is NO, or in the case of ($F_{RS}$=1), it is determined that there is no need of a warning. Then, the routine proceeds to step S54, where lane deviation warning flag $F_{DA}$ is reset to "0", and then to step S22.

When it is determined that the direction of avoiding lane deviation is the right (the direction of deviation is the left), or (Ms<0) is determined through step S38, the routine proceeds to step S55. At step S55, it is determined whether or not lane deviation warning flag $F_{DA}$ is reset to "0". When the answer to step S55 is NO, or in the case of ($F_{DA}$=1), the routine proceeds to step S39. On the other hand, when the answer to step S55 is YES, or in the case of ($F_{DA}$=0), the routine proceeds to step S56. At step S56, desired left front wheel brake cylinder pressure $Ps_{FL}$ is set to master cylinder pressure Pm, desired right front wheel brake cylinder pressure $Ps_{FR}$ is set to a sum of master cylinder pressure Pm and desired front wheel brake cylinder pressure difference $\Delta Ps_F$, desired left rear wheel brake cylinder pressure $Ps_{RL}$ is set to rear wheel master cylinder pressure Pmr, and desired right rear wheel brake cylinder pressure $Ps_{RR}$ is set to a sum of rear wheel master cylinder pressure Pmr and desired rear wheel brake cylinder pressure difference $\Delta Ps_R$, from the following equation (18).

$$Ps_{FL} = Pm$$

$$Ps_{FR} = Pm + \Delta Ps_F$$

$$Ps_{RL} = Pmr$$

$$Ps_{RR} = Pmr + \Delta Ps_R \quad (18)$$

On the other hand, when it is determined that the direction of avoiding lane deviation is the left (the direction of deviation is the right), or (Ms>0) is determined through step S38, the routine proceeds to step S57. At step S57, it is determined whether lane deviation warning flag $F_{DA}$ is reset to "0". When the answer to step S57 is NO, or in the case of ($F_{DA}$=1), the routine proceeds to step S40. On the other hand, when the answer to step S57 is YES, or in the case of ($F_{DA}$=0), the routine proceeds to step S58. At step S58, desired left front wheel brake cylinder pressure $Ps_{FL}$ is set to a sum of master cylinder pressure Pm and desired front wheel brake cylinder pressure difference $\Delta Ps_F$, desired right front wheel brake cylinder pressure $Ps_{FR}$ is set to master cylinder pressure Pm, desired left rear wheel brake cylinder pressure $Ps_{RL}$ is set to a sum of rear wheel master cylinder pressure Pmr and desired rear wheel brake cylinder pressure difference $\Delta Ps_R$, and desired right rear wheel brake cylinder pressure $Ps_{RR}$ is set to rear wheel master cylinder pressure Pmr, from the following equation (19).

$$Ps_{FL} = Pm + \Delta Ps_F$$

$$Ps_{FR} = Pm$$

$$Ps_{RL} = Pmr + \Delta Ps_R$$

$$Ps_{RR} = Pmr \quad (19)$$

Steps S50 through S52 serve for a rumble strip determination section of control unit 8 programmed to determine whether a road wheel of the vehicle is passing on a rumble strip with road irregularities continuously provided on a road shoulder. Steps S53, S54, S24, S25, S32 through S34, S38 through S40, S55 through S58, and S44 serve for a wheel torque control section of control unit 8.

Next, the following describes an actual operation of the second embodiment. First, it is determined whether or a road wheel is passing on a rumble strip (step S50). When the host vehicle is traveling under the condition of a duration (a) as shown in FIG. 12A where wheel acceleration dVw temporarily exceeds threshold acceleration S and then is held under threshold acceleration S, counter T is only initially set to initial counter value Tset, as shown in FIG. 12B. Counter flag $F_C$ is reset to "0" before timer $T_C$ exceeds $T_{C1}$, as shown in FIGS. 12C and 12D. Thus, rumble strip passing indicative flag $F_{RS}$ is held "0", as shown in FIG. 12E. Accordingly, for example, in the case the host vehicle passes on a single protrusion with no periodical fluctuation in the wheel acceleration, a wrong recognition of a rumble strip is prevented.

When the host vehicle is traveling under the condition of a duration (b) as shown in FIG. 12A where wheel acceleration dVw temporarily exceeds threshold acceleration S and then exceeds threshold acceleration S again, counter T is only initially set to initial counter value Tset, as shown in FIG. 12B, since counter T is not smaller than predetermined value T1 at the second excess. Counter flag $F_C$ is reset to "0" with counter T held "0", as shown in FIGS. 12C and 12D. Thus, rumble strip passing indicative flag $F_{RS}$ is held "0", as shown in FIG. 12E. Accordingly, for example, in the case the host vehicle passes over a bad road with no periodical fluctuation in the wheel acceleration, a wrong recognition of a rumble strip is prevented.

When the host vehicle is traveling under the condition of a duration (c) as shown in FIG. 12A where wheel acceleration dVw temporarily exceeds threshold acceleration S and then exceeds threshold acceleration S again with counter T greater than or equal to zero and smaller than or equal to predetermined value $T_1$ ($0 \leq T \leq T_1$), counter T is initially set to initial counter value Tset and set to initial counter value Tset again, as shown in FIG. 12B. Counter flag $F_C$ is held "1" under the condition where counter T is repeatedly set to predetermined initial counter value Tset, as shown in FIGS. 12C. When timer $T_C$ exceeds predetermined value $T_{C1}$, it is determined that the host vehicle is passing on road irregularities with a periodical fluctuation in the wheel acceleration, rumble strip passing indicative flag $F_{RS}$ is set to "1", as shown in FIGS. 12D and 12E (step S52). When rumble strip passing indicative flag $F_{RS}$ is set to "1", it is determined that there is no need of a warning of lane deviation with vibrations. Then, lane deviation warning flag $F_{DA}$ is reset to "0" (step S54). This prevents a combination of a vibration generated by the system and a vibration generated by an actual rumble strip, while the host vehicle is passing on the rumble strip. With the vibration generated by the rumble strip, the driver is capable of immediately and assuredly recognizing a tendency of lane deviation, and turning the steering wheel in the direction of avoiding the deviation. When lateral displacement estimate XS exceeds lane deviation prevention threshold displacement $X_C$ in the case the lateral deviating speed of the host vehicle is large or a manual operation of correcting steering is delayed, the LDP control generates desired yawing moment Ms without a warning with a vibration (steps S35 through S40, and S55 through S58).

In summary, in the shown embodiment, it is determined whether or not the road wheel is passing on a rumble strip. When it is determined that the road wheel is passing on a rumble strip, the warning with vibration is skipped. Accordingly, an overlap between a vibration by a rumble strip and a vibration by the warning of deviation is avoided. This prevents a driver to have an unnatural feel. As discussed above, in the second embodiment, when it is determined that the host vehicle is passing on a rumble strip, the warning operation of the system is skipped or inhibited. In lieu thereof, the driver may be informed of a tendency of lane deviation with a warning sound, in addition to the vibration by the rumble strip.

The entire contents of Japanese Patent Application No. 2003-151322 (filed May 28, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A warning system with vibration for an automotive vehicle comprising:
    a sensing section detecting operational states of the vehicle;
    a wheel actuator variably adjusting road wheel speed of a road wheel; and
    a control unit configured to be connected electrically to the sensing section and the wheel actuator, for automatically controlling fluctuations in the road wheel speed to generate vibrations in the vehicle based on the operational states of the vehicle.

2. The warning system as claimed in claim 1, wherein:
    the control unit comprises a deviation determination section programmed to determine a degree of lane deviation of the vehicle from a current driving lane based on the operational states of the vehicle and to determine whether there is a possibility of lane deviation of the vehicle based on the degree of lane deviation; and
    the control unit produces fluctuations in the road wheel speed to generate vibrations in the vehicle, when it is determined that there is a possibility of lane deviation of the vehicle.

3. The warning system as claimed in claim 2, wherein:
    the wheel actuator regulates wheel torque applied to the road wheel for variably adjusting the road wheel speed; and
    the control unit comprises a wheel torque control section programmed to control fluctuations in the wheel torque to control the fluctuations in the road wheel speed.

4. The warning system as claimed in claim 3, wherein:
    the wheel actuator comprises a hydraulic modulator hydraulically connected to a wheel brake cylinder at the road wheel for regulating braking torque applied to the road wheel.

5. The warning system as claimed in claim 3, wherein:
    the wheel actuator comprises a driving torque controller regulating driving torque applied to the road wheel.

6. The warning system as claimed in claim 3, wherein:
    the sensing section detects a vehicle speed; and
    the wheel torque control section controls the fluctuations in the wheel torque to generate vibrations in the vehicle based on the vehicle speed.

7. The warning system as claimed in claim 6, wherein:
    a period of the fluctuations in the wheel torque is determined based on at least one of the vehicle speed and the degree of lane deviation of the vehicle.

8. The warning system as claimed in claim 7, wherein:
the period of the fluctuations in the wheel torque is decreased with increasing vehicle speed.

9. The warning system as claimed in claim 7, wherein:
the period of the fluctuations in the wheel torque is decreased with increasing degree of lane deviation of the vehicle.

10. The warning system as claimed in claim 6, wherein:
an amplitude of the fluctuations in the wheel torque is determined based on at least one of the vehicle speed and the degree of lane deviation of the vehicle.

11. The warning system as claimed in claim 10, wherein:
the amplitude of the fluctuations in the wheel torque is increased with increasing vehicle speed.

12. The warning system as claimed in claim 10, wherein:
the amplitude of the fluctuations in the wheel torque is increased with increasing degree of lane deviation of the vehicle.

13. The warning system as claimed in claim 6, wherein:
which individual wheel torque applied to each road wheel of the vehicle is fluctuated is determined based on at least one of the vehicle speed and the degree of lane deviation of the vehicle.

14. The warning system as claimed in claim 13, wherein:
the wheel torque control section produces fluctuations in both wheel torques applied to rear road wheels, if the vehicle speed exceeds a predetermined threshold speed or the degree of lane deviation of the vehicle exceeds a predetermined threshold degree.

15. The warning system as claimed in claim 3, wherein:
the wheel torque control section produces fluctuations in wheel torque applied to a road wheel at one of left and right sides of the vehicle where the deviation determination section determines that there is a possibility of lane deviation of the vehicle.

16. The warning system as claimed in claim 15, wherein:
the wheel torque control section produces fluctuations in wheel torque applied to a rear road wheel.

17. The warning system as claimed in claim 3, wherein:
the wheel torque control section controls individually wheel torque applied to each road wheel independently of manual operation of wheel torque.

18. The warning system as claimed in claim 2, wherein:
the control unit comprises a rumble strip determination section programmed to determine whether a road wheel of the vehicle is passing on a rumble strip with road irregularities continuously provided on a road shoulder; and
the control unit controls the fluctuations in the road wheel speed based on the determination by the rumble strip determination section.

19. The warning system as claimed in claim 18, wherein:
the control unit inhibits producing fluctuations in the road wheel speed, when it is determined that a road wheel of the vehicle is passing on a rumble strip with road irregularities continuously provided on a road shoulder.

20. The warning system as claimed in claim 18, wherein:
the sensing section detects a wheel acceleration of a road wheel; and
the rumble strip determination section determines that the road wheel is passing on a rumble strip with road irregularities continuously provided on a road shoulder, when fluctuations in the wheel acceleration are periodic with an amplitude greater than a threshold acceleration during a duration longer than a threshold duration.

21. The warning system as claimed in claim 2, wherein:
the sensing section detects a vehicle speed, a heading angle of the vehicle with reference to a direction of the current driving lane, a lateral displacement of the vehicle with reference to a central position of the current driving lane, and a curvature of the current driving lane;
the deviation determination section determines a future lateral displacement estimate of the vehicle from the central position of the current driving lane as a degree of lane deviation of the vehicle based on the vehicle speed, the heading angle, the lateral displacement, and the curvature of the current driving lane; and
the deviation determination section determines that there is a possibility of lane deviation of the vehicle when the future lateral displacement estimate exceeds a predetermined lane deviation warning threshold displacement.

22. The warning system as claimed in claim 2, wherein:
the deviation determination section determines whether there is a possibility of imminent lane deviation of the vehicle based on the degree of lane deviation; and
the control unit comprises a deviation prevention section programmed to control a yawing moment applied to the vehicle in a direction opposite to a direction of a potential lane deviation when it is determined that there is a possibility of imminent lane deviation of the vehicle.

23. The warning system as claimed in claim 22, wherein:
the deviation prevention section produces a wheel torque difference between a left side and a right side of the vehicle to control the yawing moment.

24. The warning system as claimed in claim 23, wherein:
the deviation prevention section produces a wheel torque difference between a left rear road wheel and a right rear road wheel to control the yawing moment when a desired yawing moment is smaller than a predetermined threshold yawing moment.

25. The warning system as claimed in claim 22 further comprising:
a steering actuator operatively associated with a steering shaft and connected electrically to the control unit for regulating an additional steering torque to produce the yawing moment.

26. The warning system as claimed in claim 22, wherein:
the sensing section detects a vehicle speed, a heading angle of the vehicle with reference to a direction of the current driving lane, a lateral displacement of the vehicle with reference to a central position of the current driving lane, and a curvature of the current driving lane;
the deviation determination section determines a future lateral displacement estimate of the vehicle from the central position of the current driving lane as a degree of lane deviation of the vehicle based on the vehicle speed, the heading angle, the lateral displacement, and the curvature of the current driving lane; and
the deviation determination section determines that there is a possibility of imminent lane deviation of the vehicle when the future lateral displacement estimate exceeds a predetermined lane deviation prevention threshold displacement.

27. The warning system as claimed in claim 26, wherein:
the deviation determination section determines that there is a possibility of lane deviation of the vehicle when the future lateral displacement estimate exceeds a predetermined lane deviation warning threshold displacement; and the predetermined lane deviation prevention threshold displacement is greater than the predetermined lane deviation warning threshold displacement.

28. The warning system as claimed in claim 1, wherein:

the wheel actuator regulates wheel torque applied to the road wheel for variably adjusting the road wheel speed; and the control unit comprises a wheel torque control section programmed to control fluctuations in the wheel torque to control the fluctuations in the road wheel speed.

29. A warning system with vibration for an automotive vehicle comprising:

sensing means for detecting operational states of the vehicle;

wheel actuating means for variably adjusting road wheel speed of a road wheel; and control means for automatically controlling fluctuations in the road wheel speed to generate vibrations in the vehicle based on the operational states of the vehicle.

30. A method of warning with vibration for an automotive vehicle comprising:

detecting operational states of the vehicle;

determining a degree of lane deviation of the vehicle from a current driving lane based on the operational states of the vehicle;

determining whether there is a possibility of lane deviation of the vehicle based on the degree of lane deviation; and producing fluctuations in a road wheel speed to generating vibrations in the vehicle when it is determined that there is a possibility of lane deviation of the vehicle.

* * * * *